United States Patent
Cho et al.

(10) Patent No.: US 11,257,596 B2
(45) Date of Patent: Feb. 22, 2022

(54) SYSTEM AND METHOD PROVIDING SERVICES TO USER USING IOT DEVICES

(71) Applicant: LG ELECTRONICS INC., Seoul (KR)

(72) Inventors: Eunsun Cho, Seoul (KR); Sungmok Shin, Seoul (KR); Seokhee Lee, Seoul (KR); Jonghen Han, Seoul (KR); Sungho Shin, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/039,812

(22) Filed: Sep. 30, 2020

(65) Prior Publication Data

US 2021/0241925 A1   Aug. 5, 2021

(30) Foreign Application Priority Data

Jan. 30, 2020   (KR) .................. 10-2020-0011218

(51) Int. Cl.
| | |
|---|---|
| *G16Y 20/40* | (2020.01) |
| *G16Y 40/10* | (2020.01) |
| *H04L 29/08* | (2006.01) |
| *H04L 12/24* | (2006.01) |
| *G06Q 10/10* | (2012.01) |
| *H04L 29/06* | (2006.01) |
| *H04L 67/10* | (2022.01) |
| *H04L 67/53* | (2022.01) |
| *H04L 67/563* | (2022.01) |
| *H04L 67/50* | (2022.01) |

(52) U.S. Cl.
CPC .............. *G16Y 20/40* (2020.01); *G16Y 40/10* (2020.01); *H04L 67/10* (2013.01); *H04L 67/20* (2013.01); *H04L 67/22* (2013.01); *H04L 67/2814* (2013.01)

(58) Field of Classification Search
CPC ........ G16Y 20/40; G16Y 40/10; H04L 67/10; H04L 67/20; H04L 67/22; H04L 67/2814
See application file for complete search history.

(56) References Cited

U.S. PATENT DOCUMENTS

| 2015/0019342 A1* | 1/2015 | Gupta ................ G06Q 30/0269 |
| | | 705/14.66 |
| 2017/0076618 A1* | 3/2017 | Smith ...................... G09B 5/02 |
| 2019/0220273 A1* | 7/2019 | Ye .............................. G06F 8/71 |

FOREIGN PATENT DOCUMENTS

| EP | 3588912 A1 * | 1/2020 | ............. H04L 67/12 |
| KR | 20160079516 A * | 7/2016 | |

* cited by examiner

*Primary Examiner* — Christopher B Robinson
(74) *Attorney, Agent, or Firm* — Lee Hong Degerman Kang & Waimey

(57) ABSTRACT

Provided is a system for providing a service to a user using an IoT device. A system for providing a service to a user using an IoT device executes an application or software for executing a function of an IoT device on a cloud server, and the cloud server controls individual IoT devices. A system for providing a service to a user using an IoT device may be related to an artificial intelligence module, a robot, an augmented reality (AR) device, a virtual reality (VR) device, and devices related to a 5G service.

11 Claims, 17 Drawing Sheets

SYSTEM AND METHOD PROVIDING SERVICES TO USER USING IOT DEVICES

CROSS-REFERENCE TO RELATED APPLICATION(S)

Pursuant to 35 U.S.C. § 119(a), this application claims the benefit of earlier filing date and right of priority to Korean Patent Application No. 10-2020-0011218, filed on Jan. 30, 2020, the contents of which are hereby incorporated by reference herein in its entirety.

BACKGROUND OF THE INVENTION

Field of the Invention

The present disclosure relates to a system and method capable of executing an application or software that can use functions of an IoT device in a cloud environment.

Related Art

Nowadays, with the development of Internet of Things (IoT) related technologies, various IoT devices have been commercialized. According to this trend, many services between objects and between objects and people are being provided using IoT devices. In particular, with the launch of the Open Connectivity Foundation (OCF), which is a standard organization in Internet of Things, an OCF protocol is provided, and IoT devices for supporting the OCF protocol are being released. Further, while home appliances become IoT devices, the number of people who purchase IoT devices is increasing.

However, manufacturers manufacturing IoT devices are limited to providing IoT functions or services only to products thereof and thus IoT devices of different manufacturers cannot use IoT functions or services. That is, rather than using the existing OCF protocol, each IoT device manufacturer or service provider that provides IoT services has provided products and services using specialized protocols, and thus consumers could be used the IoT function or service only when purchasing the IoT device provided by the same manufacturer or service provider. Accordingly, a person who has purchased IoT devices of different manufacturers complains about inconvenience in using the IoT device.

Further, as IoT functions or services provided by each manufacturer and service provider are different, functions of IoT devices are limited to use only some IoT functions and thus consumers feel that the consumers should purchase IoT devices at very higher prices, and complaints about this are soaring.

Moreover, because the conventional IoT devices cannot learn different use patterns of each user who uses the device, the IoT devices have a functional limitation that cannot provide a user customized function or service.

SUMMARY OF THE INVENTION

An object of the present disclosure is to solve the above-described needs and/or problems.

A system and method for providing a service to a user using an IoT device according to the present disclosure provide a system and method for executing an application or software that can use functions of an IoT device in a cloud environment.

Further, a system and method for providing a service to a user using an IoT device according to the present disclosure provide a system and method for recommending applications, software, products, and services to be used by a user by learning a use pattern of the user using the IoT device with artificial intelligence.

In an aspect, a system for providing a service to a user using an IoT device includes a plurality of IoT devices disposed in a predetermined area; and a first server in which an application or software for implementing the service is driven and connected to the plurality of IoT devices by a network, wherein the first server includes a resource collection unit configured to collect status data generated in each of the IoT devices; a user account unit configured to store information about the user and to identify the user; a message processing unit configured to process the status data so as to enable all IoT devices to share the status data; an interface unit in which the user uses to control the first server; and a user service unit in which the application or the software is stored and executed.

The user service unit may execute the storing application or software to generate a control signal or command for an individual IoT device and enable the first server to directly control the individual IoT device.

The system may further include a second server configured to provide the application or software for a fee, wherein the second server may include an electronic software distribution (ESD) configured with a network.

The first server may provide a first development console or a first tool capable of developing an application or software implementing the service.

The system may further include a fourth server in which a product and information about the product are registered, wherein the first server may learn a history in which a user uses the IoT device or the service and provide a product and information to be recommended to the user among the products registered in the fourth server to the user through the IoT device.

The system may further include a fifth server configured to store advertisement or a content for the product registered in the fourth server, wherein the first server may provide advertisement or a content for a product to be recommended to the user based on the learning result of the history to the user through the IoT device.

The devices may include at least one of a television, a speaker, a smart phone, an air conditioner, an air purifier, a refrigerator, a kimchi refrigerator, a water purifier, a dishwasher, a microwave, a washing machine, a dryer, a styler, a cleaning robot, a massage chair, a personal computer (PC), a tablet, and a projector.

The interface unit may recognize and process a text input by the user or a voice generated by the user as a command of the user.

The system may further include a third server having the same configuration as that of the first server, wherein the third server may transmit a control signal or command generated in an application or software executing in the third server to the first server, and wherein the first server may transmit the status data to the third server and transmit a control signal or a command generated in the third server to the plurality of IoT devices.

In another aspect, a method of providing a service using a system for providing the service to a user using an IoT device includes determining, by a first server, whether there is a second server registered with an application or software implementing the service; downloading, by the user, an application or software purchased or subscribed from the second server to the first server; executing the downloaded application or software in the first server; generating, by the executing application or software, a control signal or a command for an individual IoT device; and controlling, by the first server, a plurality of IoT devices.

The method may further include, before the determining of whether there is a second server, collecting, by the first server, status data generated in each of the IoT devices; and learning, by the user, a history of the service provided through a function of the IoT device or a use history of the IoT device with artificial intelligence.

The determining of whether there is a second server may include searching for an application or software to be recommended to the user among applications or software registered in the second server based on the learning result.

The method may further include, after the learning of a history of the service, collecting, by the first server, server, a product to be recommended to the user and information on the product based on a learning result; and providing, by the first server, the collected product and information about the product to the user through the IoT device.

In another aspect, a method of providing a service using a system for providing the service to a user using an IoT device includes downloading an application or software purchased by the user from a second server to a third server; executing the application or software downloaded to the third server on the third server; generating, by the application or the software executing in the third server, a control signal or a command for the IoT device; transmitting the generated control signal or command to a first server; relaying, by the first server, the control signal or the command to the IoT device; transmitting, by the IoT device, feedback to the first server; and determining, by the first server, a current state of the IoT device by analyzing the feedback.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the disclosure, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

Figure 1:
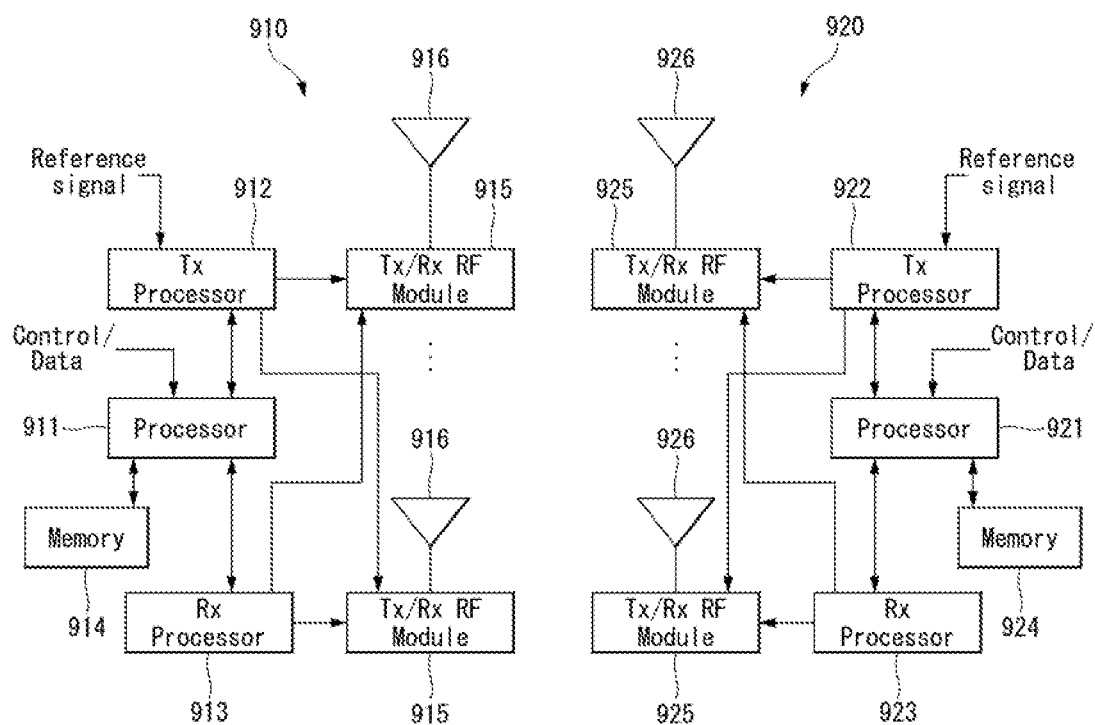
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
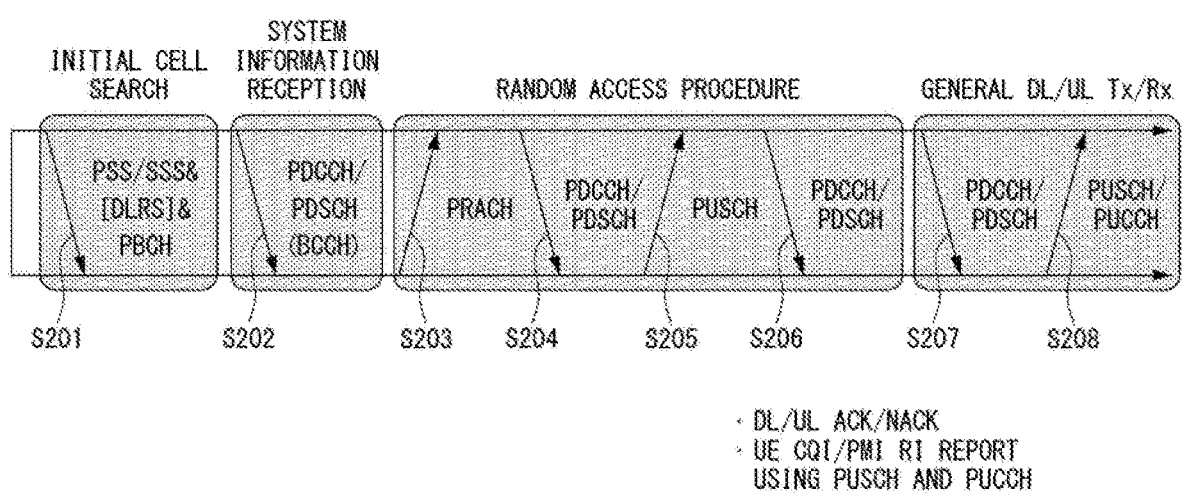
FIG. 2 shows an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceS etList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

Figure 3:
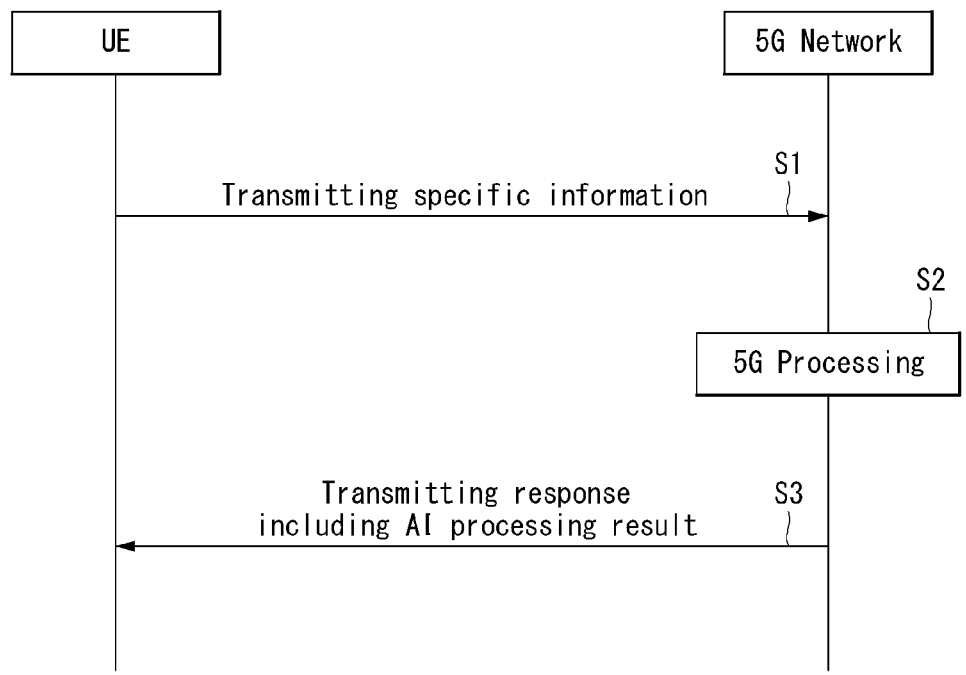
FIG. 3 shows an example of basic operations of an autonomous vehicle and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

H. A Block Diagram of an AI Apparatus

Figure 4:
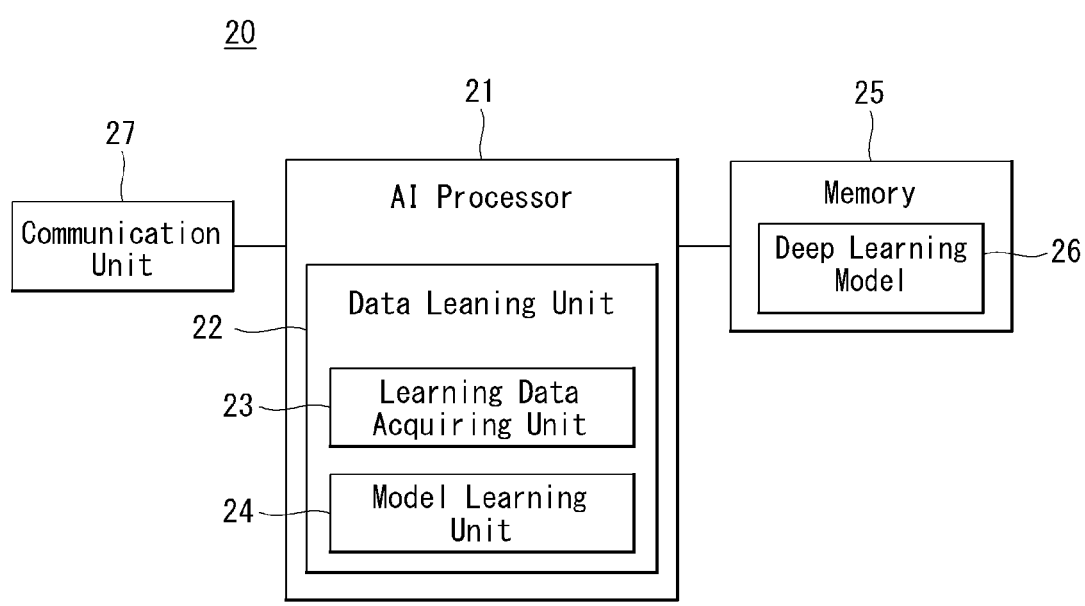
FIG. 4 is a block diagram of an AI apparatus according to an embodiment of the present disclosure.

FIG. 4 is a block diagram of an AI apparatus according to an embodiment of the present disclosure.

Referring to FIG. 4, an AI apparatus 20 may include an electronic device including an AI module which may perform an AI processing or a server including the AI module. In addition, the AI apparatus 20 may be included as at least an element of the vehicle 10 shown in FIG. 4 and provided to perform at least a part of AI processing.

The AI processing may include all operations related to driving of the vehicle 10 shown in FIG. 4. For example, the automatic driving vehicle may perform AI processing of sensing data or driver data and perform operations of processing/determination and generating a control signal. Furthermore, for example, the automatic driving vehicle may perform an automatic driving control by performing AI processing of data obtained through an interaction with another electronic device provided in the vehicle.

The AI apparatus 20 may include an AI processor 21, a memory 25 and/or a communication unit 27.

The AI apparatus 20 may be a computing apparatus which may perform a neural network learning and implemented with various electronic devices such as a server, a desktop, a PC, a notebook PC, a tablet PC.

The AI processor 21 may perform a neural network learning using the program stored in the memory 25. Particularly, the AI processor 21 may perform a neural network learning for recognizing vehicle related data. Here, the neural network for recognizing the vehicle related data may be designed to simulate a brain structure of a human on a computer and may include a plurality of network nodes having a priority which simulating a neuron of human neural network. A plurality of network nodes may exchange data according to each connection relation to simulate a synaptic activity of the neuron, which the neuron exchanges a signal through a synapse. Here, the neural network may include a deep learning model which is developed from the neural network model. In the deep learning model, a plurality of network nodes may exchange data according to a convolution connection relation with being located in different layers. An example of the neural network model may include various deep learning techniques such as deep neural networks (DNN), convolutional deep neural networks (CNN), Recurrent Boltzmann Machine (RNN), Restricted Boltzmann Machine (RBM), deep belief networks (DBN), Deep Q-Network, and may be applied to a field such as computer vision, voice recognition, natural language process and voice/signal processing.

The processer that performs the functions described above may be a general-purpose processor (e.g., CPU) but an AI-dedicated processor (e.g., GPU) for an artificial intelligence learning.

The memory 25 may store various types of program and data required for an operation of the AI apparatus 20. The memory 25 may be implemented with non-volatile memory, volatile memory, flash memory, hard disk drive (HDD) or solid-state drive (SDD). The memory 25 may be accessed by the AI processor 21 and read/record/modification/deletion/update of data may be performed by the AI processor 21. In addition, the memory 25 may store a neurotic network model (e.g., deep learning model 26) which is generated through a learning algorithm for data classification/recognition according to an embodiment of the present disclosure.

The AI processor 21 may include a data learning unit 22 that learns a neurotic network for the classification/recognition. The data learning unit 22 may learn a criterion on which learning data is used to determine the classification/recognition and how to classify and recognize data using the learning data. The data learning unit 22 may obtain learning data used for learning and apply the obtained learning data to the deep learning model, and accordingly, learn the deep learning model.

The data learning unit 22 may be manufactured in at least one hardware chip shape and mounted on the AI apparatus 20. For example, the data learning unit 22 may be manufactured in hardware chip shape dedicated for the artificial intelligence (AI) or manufactured as a part of a general-purpose processor (CPU) or a graphic processing processor (GPU) and mounted on the AI apparatus 20. Furthermore, the data learning unit 22 may be implemented with a software module. In the case that the data learning unit 22 is implemented with a software module (or program module including instruction), the software module may be stored in a non-transitory computer readable media. In this case, at least one software module may be provided by an Operating System (OS) or an application.

The data learning unit 22 may include a learning data acquisition unit 23 and a model learning unit 24.

The learning data acquisition unit 23 may acquire learning data which is required for the neurotic network model for classifying and recognizing data. For example, the learning data acquisition unit 23 may obtain vehicle data and/or sample data for being inputted in the neurotic network model as learning data.

The model learning unit 24 may learn to have a determination criterion how to classify predetermined data by the neurotic network model using the obtained learning data. In this case, the model learning unit 24 may learn the neurotic network model through a supervised learning that uses at least one determination criterion among learning data. Alternatively, the model learning unit 24 may learn the learning data without supervising and learn the neurotic network model through an unsupervised learning which discovers a determination criterion. In addition, the model learning unit 24 may learn the neurotic network model through a reinforcement learning using a feedback whether a result of an assessment of situation according to learning is correct. Furthermore, the model learning unit 24 may learn the neurotic network model using a learning algorithm including an error back-propagation or a gradient decent.

When the neurotic network model is learned, the model learning unit 24 may store the learned neurotic network model in a memory. The model learning unit 24 may store learned neurotic network model in the memory of a server connected to the AI apparatus 20 in wired or wireless manner.

The data learning unit 22 may further include a learning data pre-processing unit (not shown) or a learning data selection unit (not shown) for improving an analysis result of the learning model or saving a resource or time which is required for generating a recognition model.

The learning data pre-processing unit may pre-process obtained data such that the obtained data is used for learning for an assessment of situation. For example, the learning data pre-processing unit may process the obtained data in a preconfigured format such that the model learning unit 24 uses the learning data obtained for learning an image recognition.

In addition, the learning data selection unit may select the data required for learning between the learning data obtained in the learning data acquisition unit 23 or the learning data pre-processed in the pre-processing unit. The selected learning data may be provided to the model learning unit 24. For example, the learning data selection unit may detect a specific area in the image obtained through the camera and select only the data for the object included in the specific area as the learning data.

Furthermore, the data learning unit 22 may further include a model evaluation unit (not shown) for improving the analysis result of the learning model.

The model evaluation unit may input evaluation data in the neurotic network model, and in the case that the analysis result fails to satisfy a predetermined level, make the data learning unit 22 learn the neurotic network model again. In this case, the evaluation data may be predefined data for evaluating a recognition model. As an example, in the case that the number of evaluation data or the ratio in which the analysis result is not clear exceeds a preconfigured threshold value in the analysis result of the recognition model which is learned for the evaluation data, the model evaluation unit may evaluate that the analysis result fails to satisfy the predetermined level.

The communication unit 27 may the AI processing result by the AI processor 21 to an external electronic device.

Here, an external electronic device may be defined as an IoT device. Further, the AI device 20 may be defined as another user terminal, mobile device, home appliance, or 5G network that communicates with the user terminal, the mobile device, and/or the home appliance. Meanwhile, the AI device 20 may be implemented by being functionally embedded in an AI module provided in a user terminal, a mobile device, and/or a home appliance. Further, the 5G network may include a server or a module that performs the control of the IoT device.

The AI apparatus 20 shown in FIG. 4 is described by functionally dividing into the AI processor 21, the memory 25 and the communication unit 27, but the elements described above may be integrated in a module and called an AI module.

Hereinafter, a system for providing a service to a user using an IoT device according to an embodiment of the present disclosure will be described with reference to FIGS. 5 and 6. First, FIG. 5 is a conceptual diagram illustrating a system for providing a service to a user using an IoT device according to an embodiment of the present disclosure.

Figure 5:
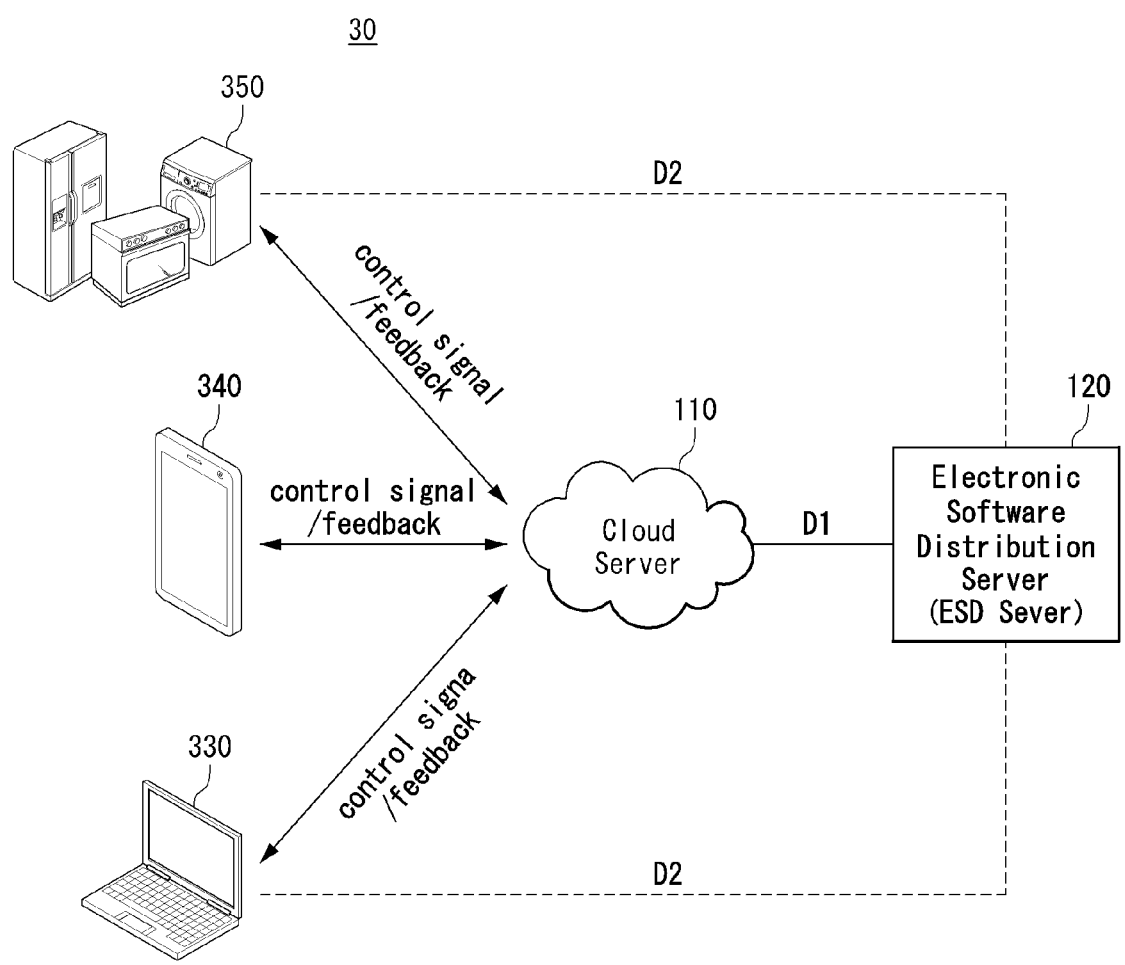
FIG. 5 is a conceptual diagram illustrating a system for providing a service to a user using an IoT device according to an embodiment of the present disclosure.

Referring to FIG. 5, a system 30 for providing a service to a user using an IoT device according to an embodiment of the present disclosure includes a plurality of servers 110 and 120 and a plurality of IoT devices 330, 340, and 350.

The plurality of servers 110 and 120 may be classified into a first server 110 and a second server 120 and include more servers in addition to a configuration of two servers. In this case, when the plurality of servers 110 and 120 include more servers than the two servers, each server may be classified into first, second, third to nth servers.

Here, the first server 110 may be configured as a server driven in a cloud environment or a server providing a cloud environment. Further, the second server 120 may be configured with an electronic software distribution. Electronic software distribution (ESD) is the distribution of software or data to users electronically. The approach is quite opposite to the practice of delivering software through physical media. Electronic software distribution can make use of download or streaming. Electronic software distribution has many advantages compared to distribution on physical media, for both vendors and customers. Electronic software distribution is also known as digital distribution.

Further, the plurality of IoT devices 330, 340, and 350 include a computer 330, a mobile device 340, and a home appliance device 350. Here, the computer 330 includes a computing device such as a personal computer (PC) and a laptop computer, and the mobile device 340 includes a portable device such as a tablet or a smartphone. Further, the home appliance device 350 may include various electronic devices such as a washing machine, a refrigerator, a dryer, an oven, an air purifier, a kimchi refrigerator, a water purifier, a dishwasher, a microwave oven, a styler, a cleaning robot, and a massage chair. Accordingly, in FIG. 5, the home appliance device 350 is illustrated to include a washing machine and a refrigerator. Meanwhile, the IoT device in the present disclosure may include a television 310 (see FIG. 8) and an air conditioner 320 (see FIG. 12) in addition to the devices illustrated in FIG. 5.

Referring to FIG. 5, in the system 30 for providing a service to a user using an IoT device according to an embodiment of the present disclosure, when the user purchases or subscribes to an application or software registered in the second server 120 as a content that can be downloaded, the application or software is downloaded D1 from the second server 120 to the first server 110, and the downloaded application or software is driven on the first server 110. The individual IoT devices 330, 340, and 350 drive functions by the control of an application or software driven in the first server 110. Accordingly, the first server 110 is configured to generate a control signal and transmit the control signal to the IoT devices 330, 340, and 350.

The first server 110 may recognize the IoT devices 330, 340, and 350, search for an application or software capable of controlling the recognized IoT device in the second server 120, and recommend the application or software to the user. Further, the first server 110 may analyze the user's IoT device use history, and grasp how often the user has used a specific function of the specific IoT device 330, 340, and 350. The first server 110 may search for an application or software necessary or optimal for driving a function of the corresponding IoT device in the second server 120 and recommend the application or software to the user.

Each of the plurality of IoT devices 330, 340, and 350 may transmit unique information (model name, firmware version, network ID, product specification, etc.) of the IoT device, current status data of the IoT device, and/or feedback to the control signal transmitted from the first server 110 to the first server 110. The first server 110 may grasp a status of each of the IoT devices 330, 340, and 350 through status data and feedback transmitted from each of the IoT devices 330, 340, and 350, and the first server 110 may grasp the control result of each of the IoT devices 330, 340, and 350.

The second server 120 holds an application or software in which the user wants to purchase or subscribe. For example, the second server 120 may be implemented into "App Store" of "Apple" or "Play Store" of "Google". Further, the second server 120 may be implemented similarly to "App Store" and "Play Store".

Each of the IoT devices 330, 340, and 350 may be directly connected to the second server 120 through a network, directly download and store an application or software purchased or subscribed by a user from the second server 120, and be configured to execute the downloaded application or software.

However, as described above, when manufacturers of the individual IoT devices 330, 340, and 350 illustrated in the present embodiment are different, all of applications or software for using the individual IoT devices 330, 340, and 350 may be different, and specific application or software may have limitations of compatible IoT devices for each manufacturer. Further, whenever the user selectively uses the individual IoT devices 330, 340, and 350, the user consumes a lot of time and effort when an application or software is downloaded from the second server 120 using the IoT device in use.

Therefore, in the system 30 according to the present embodiment, in order to solve such inconvenience, the first server 110 may automatically search for and executes an application or software required for execution or control of the individual IoT device to control the individual IoT device and to provide a situation or result under the control to the user.

A detailed configuration of the system 30 according to the present embodiment will be described in more detail with reference to FIG. 6. FIG. 6 is a block diagram illustrating a configuration of a system for providing a service to a user using an IoT device according to an embodiment of the present disclosure.

Figure 6:
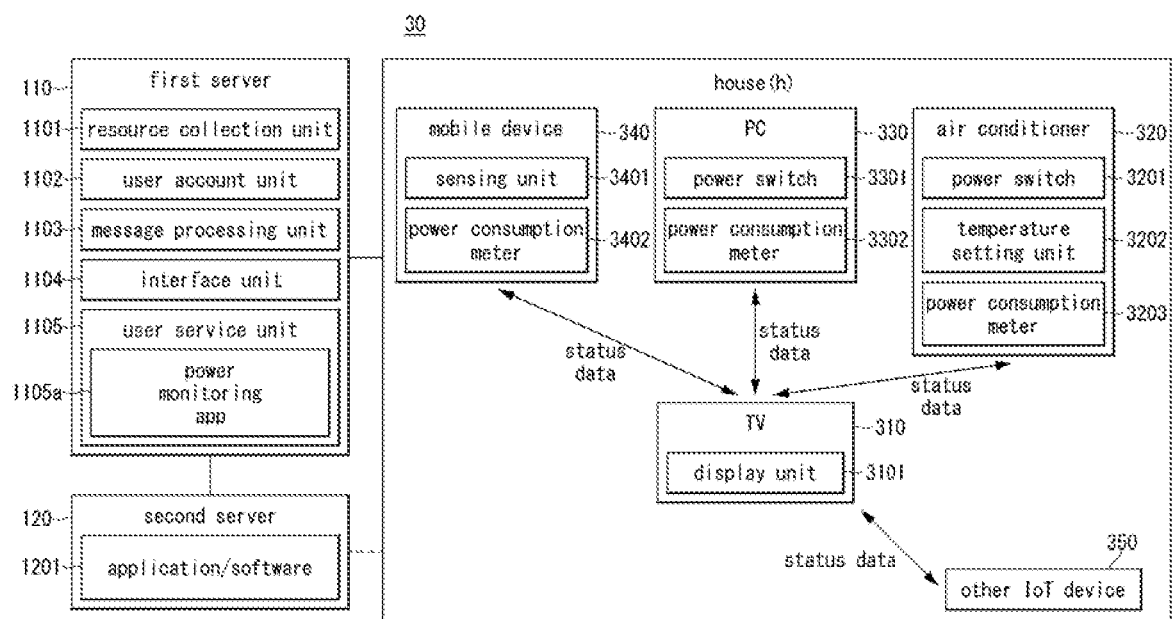
FIG. 6 is a block diagram illustrating a configuration of a system for providing a service to a user using an IoT device according to an embodiment of the present disclosure.

Referring to FIG. 6, as an example in which the system 30 according to the present embodiment is implemented, the system 30 is illustrated that controls a television 310, an air conditioner 320, and a PC 330 disposed in the user's house, a mobile device 340 including a smart phone, and another IoT device 350 including a household appliance such as a washing machine, an air purifier, and a dishwasher. Further, all of the television 310, the air conditioner 320, the PC 330, the mobile device 340, and the other IoT device 350 are connected to the first server 110 and the second server 120 by the network.

Here, the first server 110 includes a resource collection unit 1101, a user account unit 1102, a message processing unit 1103, an interface unit 1104, and a user service unit 1105.

The resource collection unit 1101 is configured to collect status data generated in each of the IoT devices 310, 320, 330, 340, and 350 and to provide the status data to a user. In some implementations, the resource collection unit 1101 may correspond to one or more processors. In other implementations, the resource collection unit 1101 may correspond to software components configured to be executed by one or more processors.

The user account unit 1102 stores and manages information about all users who use the individual IoT devices 310, 320, 330, 340, and 350. In particular, the user account unit 1102 may classify and store information of all users who use the individual IoT devices 310, 320, 330, 340, and 350 in the form of an account. Further, the user account unit 1102 may identify who uses the individual IoT devices 310, 320, 330, 340, and 350 using the stored user information. In some implementations, the user account unit 1102 may correspond to one or more processors. In other implementations, the user account unit 1102 may correspond to software components configured to be executed by one or more processors.

The message processing unit 1103 processes so that all IoT devices share status data generated in the individual IoT devices 310, 320, 330, 340, and 350. Further, the message processing unit 1103 may recognize a voice or a text message input by the user through the individual IoT devices 310, 320, 330, 340, and 350 and enable the IoT devices 310, 320, 330, 340, and 350 to execute a function according to the recognized voice or text. In some implementations, the message processing unit 1103 may correspond to one or more processors. In other implementations, the message processing unit 1103 may correspond to software components configured to be executed by one or more processors.

Further, the message processing unit 1103 may transfer a voice or a text message of a user input through a specific IoT device to another IoT device or may enable a voice or a text message of a user to be output to another IoT device. For example, when the mobile device 340 is implemented with a smart phone and when the user inputs a voice or a text to the smart phone 340, the message processing unit 1103 may transfer a voice or a text input by the user to the television 310, the PC 330 and/or the other IoT device 350, and enable the voice or text input by the user to be output from the corresponding device.

The interface unit 1104 is configured with an interface used by the user in order to directly use or control the first server 110, and such an interface may be configured as an existing input type interface such as a keyboard, a mouse, and a touch pad, but the interface unit 1104 may be configured to input a command to the first server 110 by the user through the user's voice, face, pupil, fingerprint, and the like.

Further, the user service unit 1105 is a space in which an application or software purchased or subscribed by the user from the second server 120 is downloaded and stored. Further, the user service unit 1105 is configured to execute the downloaded application or software. To this end, the user service unit 1105 may be configured to include a CPU and/or a GPU and also include a CPU and/or a GPU with artificial intelligence learning capabilities. In some implementations, the user service unit 1105 may correspond to one or more processors. In other implementations, the user service unit 1105 may correspond to software components configured to be executed by one or more processors.

Further, although not illustrated in FIG. 6, the first server 110 may include an AI processor 131 illustrated in FIG. 4. The first server 110 may learn the user's IoT device usage history using the data learning unit 132 of the AI processor 131 and classify applications or software to be recommended to the user. Further, the first server 110 may grasp the user's life pattern using the data learning unit 132 of the AI processor 131 and predict a product in which the user is expected to need or advertisement for the product to provide the product or the advertisement to the user.

The second server 120 stores an application 1201 or software 1201 in which the user can purchase or subscribe. The user may purchase or subscribe to the application or software 1201 from the second server 120 through a payment system.

Because various IoT devices 310, 320, 330, 340, and 350 disposed in the house h are configured to have different functions, a configuration or a block of the IoT devices 310, 320, 330, 340, and 350 illustrated in FIG. 6 is merely illustrated for convenience of description.

For example, the television 310 may be configured to include a display unit 3101. The air conditioner 320 may be configured to include a power switch 3201, a temperature setting unit 3202, and a power consumption meter 3203. Further, the PC 330 may be configured to include a power switch 3301 and a power consumption meter 3302. The mobile device 340 may be configured to include a sensing unit 3401 including various sensors and a power consumption meter 3402.

Further, in order to efficiently control the IoT devices 310, 320, 330, 340, and 350 disposed in a house h, the system 30 according to the present embodiment may distinguish a main device and a sub device.

For example, as illustrated in FIG. 6, the system 30 according to the present embodiment may select the television 310 among IoT devices 310, 320, 330, 340, and 350 disposed in the house h as a main device and classify other IoT devices 320, 330, 340, and 350 as sub-devices. In this case, the television 310 may receive and process status data generated in the other IoT devices 320, 330, 340, and 350, and then display status data for each device through the display unit 3101.

Further, the television 310 may receive a control signal from the first server 310 and relay the control signal to the other IoT devices 320, 330, 340, and 350. The first server 310 may output information to be provided to the user, i.e., a recommended application or a recommended product through the display unit 3101 of the television 310.

Figure 7:
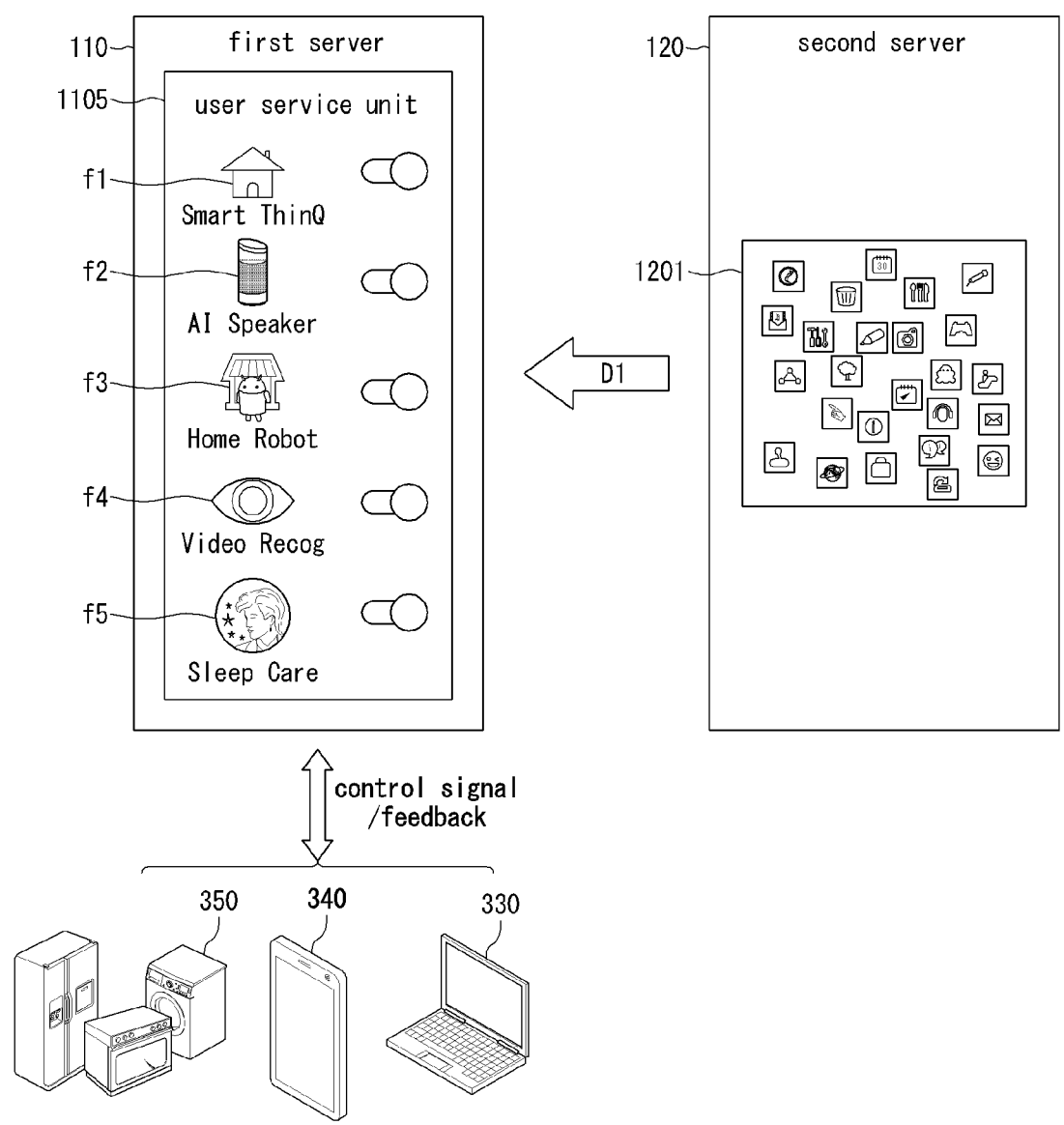
FIG. 7 is a diagram illustrating a scenario that provides a service to a user using a system according to the present disclosure.

A use example in which a user drives functions of IoT devices 320, 330, 340, and 350 using a system 30 according to the present embodiment will be described with reference to FIG. 7. FIG. 7 is a diagram illustrating a scenario of providing a service to a user using a system according to the present disclosure.

Referring to FIG. 7, the user may purchase software or an application (hereinafter, referred to as an app) 1201 from the second server 120. The app 1201 purchased from the second server 120 is downloaded to the first server 110 (D1). In this case, the downloaded app 1201 controls a function of a specific IoT device (any one of 320, 330, 340, and 350) or two or more IoT devices 320, 330, 340, and 350 to enable at least one service to be provided to the user to be implemented.

For example, as illustrated in FIG. 7, the app 1201 purchased by the user from the second server 120 may be configured so that various IoT devices 320, 330, 340, and 350 disposed in the house h provide a service that enables to interwork f1 each other. That is, when the first server 110 executes the app 1201 and the smartphone 340 receives an SNS message, the PC 330 and the other IoT devices 350 disposed in the house h may display an SNS message received by the smartphone 340.

For another example, the app 1201 may be configured to provide a service for recognizing a user's voice and for learning the recognized voice with artificial intelligence to respond f2. That is, when the first server 110 executes the app 1201 and the user's voice command is recognized by the PC 330, the PC 330 may learn the voice command spoken by the user with artificial intelligence to determine the user's intention and to execute a response corresponding to the user's intention.

For another example, the app 1201 may be configured to provide a home robot service that manages f3 the house h using a specific IoT device (any one of 320, 330, 340, and 350). That is, when the first server 110 executes the app 1201, the refrigerator 350, which is one of the other IoT devices 350, may identify IoT devices currently operating in the house h. The refrigerator 350 identifies devices waiting for a user input among IoT devices while operating by the control of the first server 110 and the app 1201. Thereafter, the refrigerator 350 may switch a mode of devices waiting for a user input to a power saving mode or may turn off power to minimize a power consumption amount consumed in the corresponding device. The refrigerator 350 may display a current state of each device through a built-in display unit and notify the user that the first server 110 executes the app 1201 to manage f3 the house h.

For another example, the app 1201 may be configured to provide an image recognition f4 service using a specific IoT device (any one of 320, 330, 340, and 350). That is, when the first server 110 executes the app 1201, the PC 330 may recognize the user's face or the user's pupil using a built-in camera. Further, when the first server 110 executes the app 1201, the PC 330 may recognize the user's movement using the built-in camera. The PC 330 may log in according to a user's facial recognition or pupil recognition result. Further, the PC 330 may recognize the user's movement, determine the user's health state, and output the determination result to the screen.

For another example, the app 1201 may be configured to provide a service for monitoring a user's sleep f5 using a specific IoT device (any one of 320, 330, 340, and 350). That is, when the first server 110 executes the app 1201, the smart phone 340, which is a mobile device, may sense the user's sleeping state, grasp the user's sleeping state, and output the result to the screen.

In this way, in order for the first server 110 to execute the app 1201 and to control individual IoT devices, the user service unit 1105 according to the present embodiment executes an application or software being downloaded and stored from the second server 120 to generate control signals or commands for individual IoT devices. The first server 110 transmits the generated control signal or control command to the individual IoT device to enable to directly control the individual IoT device.

Further, the first server 110 may be a cloud server implemented in a cloud environment, and because the first server 110 may be configured to directly provide a cloud environment, the user service unit 1105 may execute the app 1201 downloaded from the second server 120 in a cloud environment.

Figure 8:
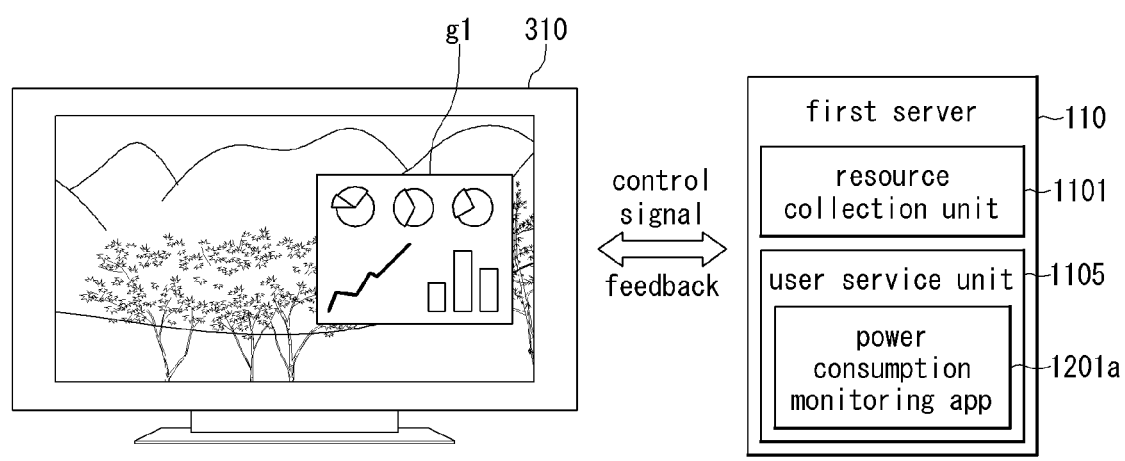
FIG. 8 is a diagram displaying specific information through a television according to a service in which a system provides to a user according to the present disclosure.

Hereinafter, another example of a scenario in which the system 30 according to the present disclosure provides a service to a user using an IoT device will be described with reference to FIGS. 8, 9A, and 9B. FIG. 8 is a diagram illustrating that a system displays specific information through a television according to a service providing to a user according to the present disclosure.

When it is assumed that the user has purchased an app 1201a capable of monitoring power consumption from the second server 120, as illustrated in FIG. 8, the user service unit 1105 of the first server 110 may download the power consumption monitoring app 1201a from the second server 120.

Further, the power consumption monitoring app 1201a may monitor power consumption of all IoT devices disposed in the house h, which is a space in which the user lives, and for this, it is assumed that the power consumption monitoring app 1201a may collect and classify a power consumption amount of individual IoT devices to output the power consumption amount in a graph or a chart.

In this case, the user service unit 1105 executes the power consumption monitoring app 1201a to enable the app 1201a to be driven on the first server 110. While being executed on the first server 110, the power consumption monitoring app 1201a may generate a data collection request for a power consumption amount of individual IoT devices disposed in the user's house h. The user service unit 1105 transfers a request of the app 1201a to the resource collection unit 1101, and the resource collection unit 1101 may classify status data transmitted from the individual IoT devices according to the request of the power consumption monitoring app 1201a to collect a power consumption amount for each IoT device.

The power consumption monitoring app 1201a may analyze the power consumption amount collected and classified in the resource collection unit 1101 and express a power consumption amount for each time-device with graphic g1 including graphs, diagrams, figures, text, icons, and images. The user service unit 1105 may output the graphic g1 to the television 310 to enable the user to recognize an amount of power consumed for each IoT device.

Figure 9A:
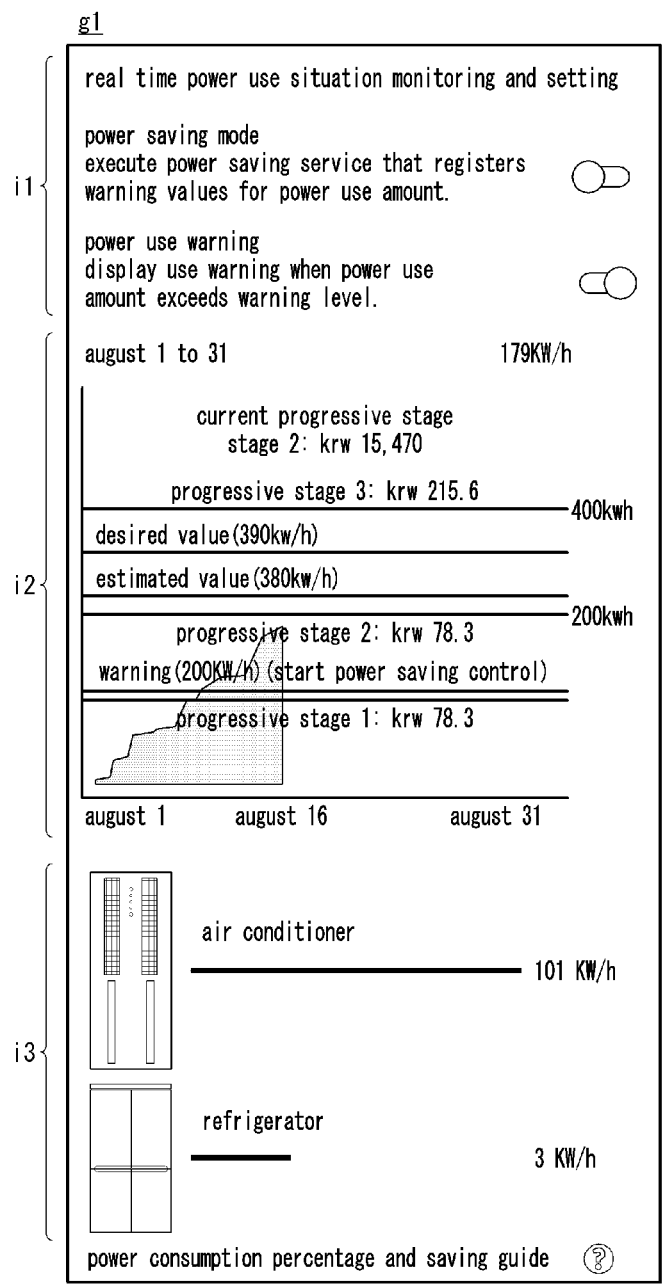
FIGS. 9A and 9B are diagrams illustrating an example of graphic g1 illustrated in FIG. 8.
Figure 9B:
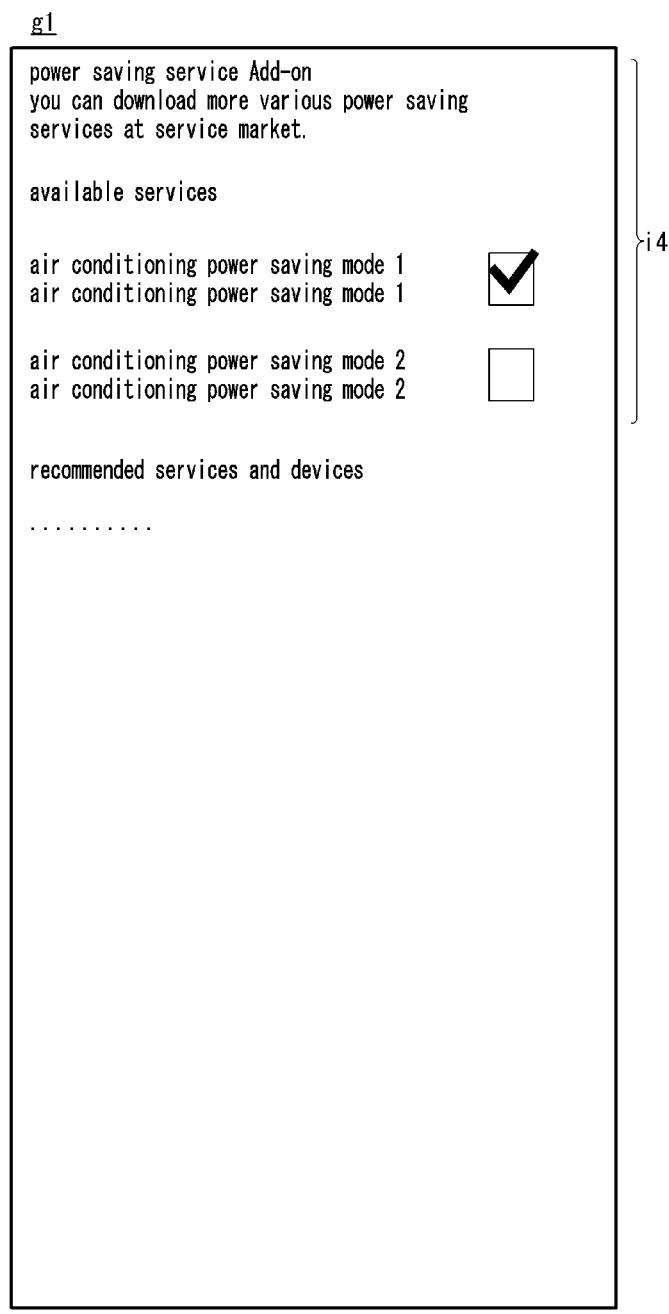

Further, graphic g1 generated by the power consumption monitoring app 1201a and output to the television 310 may be configured to include various information, as illustrated in FIGS. 9A and 9B. FIGS. 9A and 9B are diagrams illustrating an example of the graphic g1 illustrated in FIG. 8. However, FIGS. 9A and 9B merely illustrate examples of the form in which the graphic g1 is configured.

The power consumption monitoring app 1201a may generate graphic g1 including setting interfaces i1 and i4, a graph i2, and an icon i3, as illustrated in FIGS. 9A and 9B, and the user service unit 1105 outputs the graphic g1 to the television 310 to enable the user to interact with the power consumption monitoring app 1201a.

Referring to FIGS. 9A and 9B, the setting interfaces i1 and i4 may set an alarm so that an alert occurs when a power use amount exceeds a predetermined amount and is configured with an interface that may set a mode of a specific IoT device such as the air conditioner 320 to a power saving mode.

The graph i2 illustrated in FIGS. 9A and 9B graphically shows a total amount of power consumed in the user's house h between "August 1 to August 31", which is a predetermined period. Further, the graph i2 may set a predicted value or a warning value of a power consumption amount to enable the user to take an action according to the power consumption amount.

The icon i3 illustrated in FIGS. 9A and 9B intuitively displays an amount of power used for each IoT device.

Accordingly, because the graphic g1 including the setting interfaces i1 and i4, the graph i2, and the icon i3 is displayed on the television 310, the user may easily grasp an amount of power consumed in the house h, and because it is unnecessary to download and install the power consumption monitoring app 1201a for each IoT device, the user can easily use the app 1201a.

Figure 10:
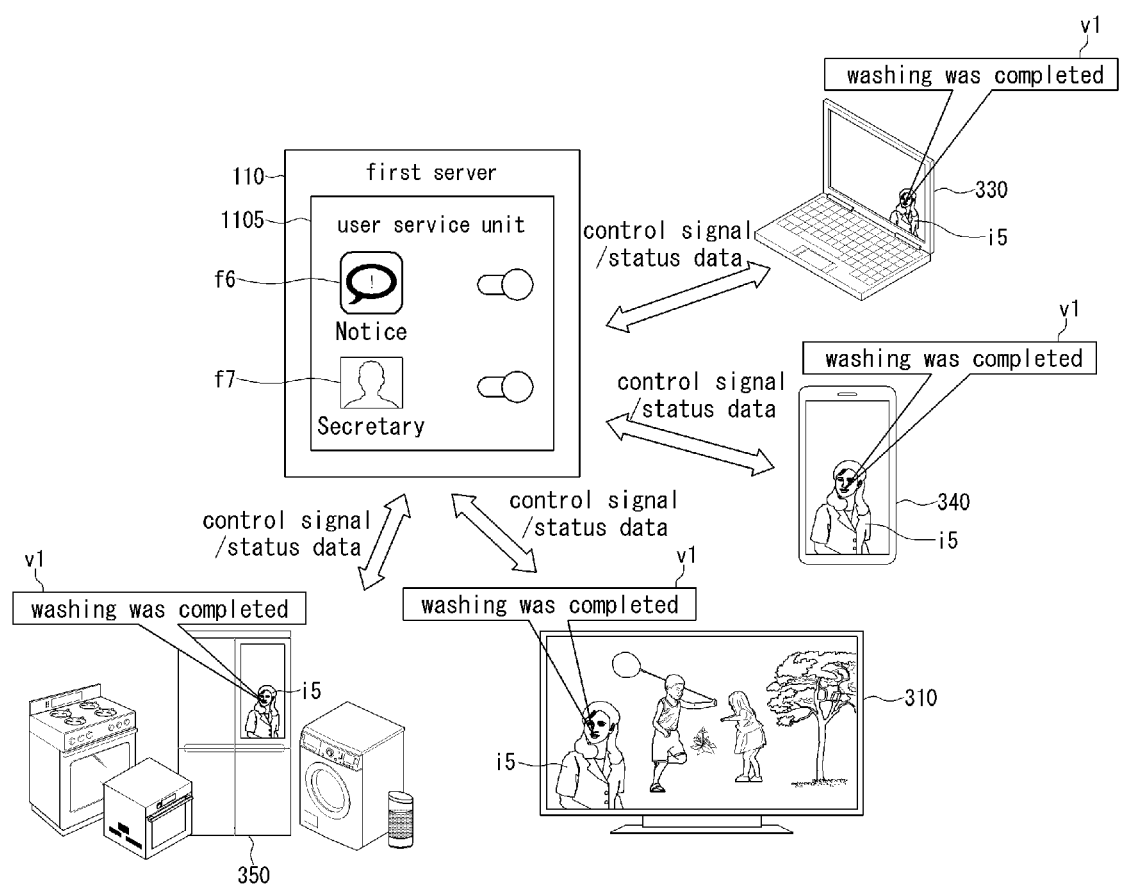
FIG. 10 is a diagram illustrating a scenario in which a system provides a personal assistant service to a user according to the present disclosure.

Hereinafter, another example of a scenario in which the system 30 according to the present disclosure provides a service to a user using an IoT device will be described with reference to FIG. 10. FIG. 10 is a diagram illustrating a scenario in which the system according to the present disclosure provides a personal assistant service to a user.

First, it is assumed that the user has purchased an app 1201 capable of providing a notification service f6 and a personal assistant service f7 in the second server 120. It is assumed that the app 1201 is downloaded to the first server 110 and is executed by the user service unit 1105. It is assumed that the app 1201 capable of providing the notification service f6 and the personal assistant service f7 is an app configured to output a status, an alarm of individual IoT devices or a user's schedule using at least one IoT device.

Referring to FIG. 10, when a washing machine, which is one of the other IoT devices 350, has completed washing, the washing machine may generate a message v1 indicating that washing has been completed. The message v1 includes both a text message and a voice message.

The washing machine 350 may transmit a message v1 about washing completion to the television 310, the PC 330, and the mobile device 340, including the first server 110 connected through a network. In this case, the app 1201 capable of providing the notification service f6 and the personal assistant service f7 may output the washing completion message v1 transmitted from the washing machine 350 together with a personal assistant image i5 through the plurality of IoT devices. Accordingly, as illustrated in FIG. 10, another IoT device 350 such as the television 310, the PC 330, the mobile device 340, and the refrigerator may output a personal assistant image i5 through the display unit. Further, as illustrated in FIG. 10, other IoT devices 350 such as the television 310, the PC 330, the mobile device 340, and the refrigerator may output a washing completion message v1 through a display unit or a speaker unit. Accordingly, the user may recognize that washing is completed through the washing completion message v1 output from various IoT devices.

Further, the first server 110 may provide a first tool or a first development console capable of producing an application or software to developers. Because users may upload use reviews of the app 1201 and device use reviews to the first server 110, developers may directly check user feedback and develop applications or software that provides services required by users on the first server 110 with the first development console or the first tool.

Figure 11:
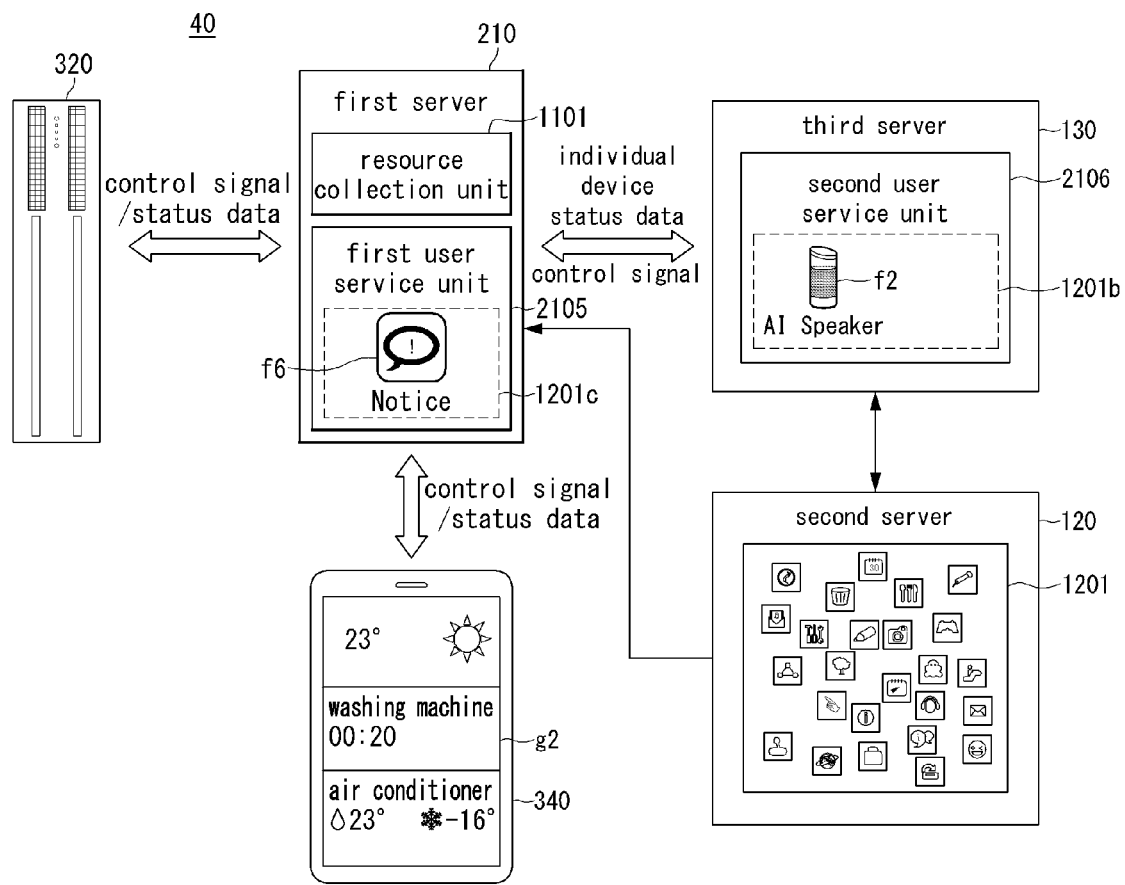
FIG. 11 is a diagram illustrating an example of a system configured with a cloud environment according to another embodiment of the present disclosure.

Hereinafter, a scenario in which the system 40 according to another embodiment of the present disclosure is driven in a cloud environment will be described with reference to FIG. 11. FIG. 11 is a diagram illustrating an example in which a system is configured with a cloud environment according to another embodiment of the present disclosure.

Referring to FIG. 11, in order to configure the system 40 according to the present embodiment with a cloud environment, the system 40 includes a first server 210 that collects status data of IoT devices and that relays a control signal and a third server 130 that directly executes the app 1201. The first server 210 and the third server 130 described in the present embodiment may include the same configuration as that of the first server 110 illustrated in FIG. 6. However, it is unnecessary that the first server 210 and the third server 130 described in the present embodiment are equally configured to the first server 110 illustrated in FIG. 6. However, the first server 210 and the third server 130 described in the present embodiment include the same user service units 2105 and 2106 as a user service unit 1105 included in the first server 110 illustrated in FIG. 6. In the present embodiment, the user service unit included in the first server 210 may be referred to as a first user service unit 2105, and a user service unit included in the third server 130 may be referred to as a second user service unit 2106.

Referring to FIG. 11, the first server 210 includes a resource collection unit 1101 and a first user service unit 2105, and the third server 130 includes a second user service unit 2106. The first server 210 and the third server 130 are connected by a network.

The first server 210 collects status data of the individual IoT devices through the resource collection unit 1101 and transmits the status data to the third server 130. In the present embodiment illustrated in FIG. 11, it is illustrated that the resource collection unit 1101 collects status data of the air conditioner 320.

The third server 130 may recognize the IoT device using the status data of the individual IoT device transmitted from the first server 210 and select and download an app appropriate for the control of the corresponding IoT device in the second server 120. Further, the third server 130 may download the app from the second server 120 and store the app in the second user service unit 2106 according to the history in which the user purchased the app.

It is illustrated that the second user service unit 2106 illustrated in FIG. 11 downloads and stores an app 1201b that provides a service that recognizes a user's voice and learns the voice with artificial intelligence to respond f2 from the second server 120.

According to the example illustrated in FIG. 11 and as described above, a scenario in which the system 40 according to the present disclosure controls an IoT device so as to provide a service to a user will be described as follows.

The user wants that the air conditioner 320 installed in an office recognizes the user's voice and is operated. In order to enable the air conditioner 320 to perform a voice recognition function, the user purchased an app 1201b that provides a voice recognition and response service in the second server 120.

In this case, the third server 130 downloads and executes the app 1201b from the second server 120, and the first server 210 collects status data of the air conditioner 320 through the resource collection unit 1101 and transmits the status data to the third server 130. The third server 130 processes status data of the air conditioner 320 through the app 1201b executing in the second user service unit 2106, and generates a control signal of the air conditioner 320 to transmit the control signal to the first server 210. The first server 210 relays the control signal transmitted from the third server 130 by the first user service unit 2105 to the air conditioner 320, and a function of the air conditioner 320 is operated by the transmitted control signal.

The first user service unit 2105 of the first server 210 analyzes status data of the air conditioner 320 and/or the control signal transmitted from the second user service unit 2106, and searches for an app 1201c capable of displaying information about the air conditioner 320 to the user in the second server 120. When the first server 210 finds an app 1201c capable of displaying information about the air conditioner 320 in the second server 120, the first server 210 transmits a notification that recommends the app 1201c to the mobile device 340 in which the user is using. Thereafter, when the user purchases the app 1201c from the second server 120, the first server 210 downloads the app 1201c and stores and executes the app 1201c in the first user service unit 2105.

The app 1201c analyzes the status data of the air conditioner 320 collected through the resource collection unit 1101 and expresses the status data with graphic g2, and the first server 210 outputs the graphic g2 through the display unit of the mobile device 340 to enable the user to grasp the state of the air conditioner 320. Further, the user may interact with the graphic g2 to set an operation mode of the air conditioner 320.

Hereinafter, a system 50 for providing a service to a user using an IoT device according to another embodiment of the present disclosure will be described with reference to FIG.

Figure 12:
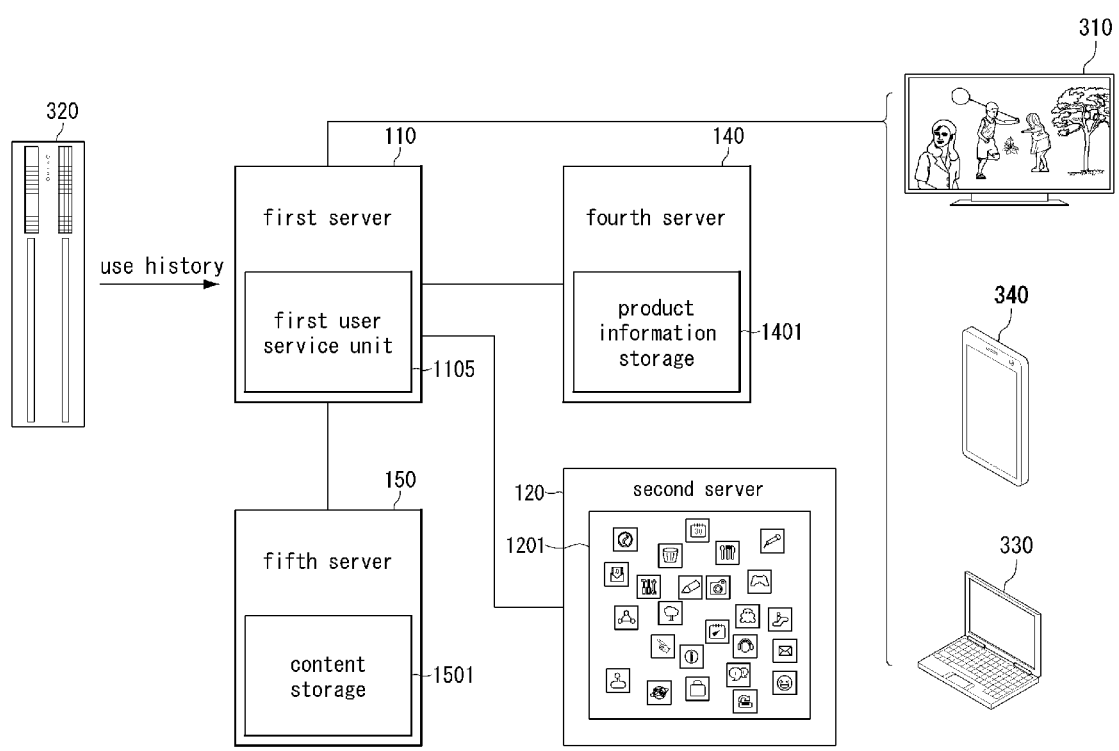
FIG. 12 is a diagram illustrating a system according to another embodiment of the present disclosure.

12. FIG. 12 is a diagram illustrating a system according to another embodiment of the present disclosure.

The system 50 according to the present embodiment may further include a server in which a product that can be purchased by a user is registered and/or a server that stores contents for the product. Here, a server in which a product that can be purchased by a user is registered may be referred to as a fourth server 140, and a server that stores contents about the product may be referred to as a fifth server 150.

Referring to FIG. 12, the system 50 according to another embodiment of the present disclosure includes the same server as the first server 110 illustrated in FIG. 6. However, compared to the system 30 according to an embodiment of the present disclosure, the system 50 according to the present embodiment is different from the system 30 in that the system 50 further includes a fourth server 140 in which a product associated with a service provided by an app and information about the product are registered and a fifth server 150 for storing advertisements or contents about products registered in the fourth server 140.

The fourth server 140 may be configured with a server for implementing e-commerce. That is, the fourth server 140 may be implemented in a virtual space in which a transaction act of buying and selling products or services is made on a network such as Internet using a computer or the like. Accordingly, the fourth server 140 may be configured to use a cyberspace as a marketplace, i.e., a market using the World Wide Web and an electronic medium (system).

The fifth server 150 may be configured with a content hosting website. The content includes advertisements for products registered in the fourth server 140.

In the present embodiment, the first server 110 may learn a history of the user using the IoT device, a history of the purchased app, and/or a history of a service received through the app to search for products related to the service received by the user in the fourth server 140, and provide or recommend the corresponding product and information on the product to the user.

Further, while searching for a product to be recommended to the user, the first server 110 according to the present embodiment may search for a content related to the product in the fifth server 150 and simultaneously provide the content to the user while recommending the product.

An example of a scenario in which the first server 110 according to the present embodiment recommends products and advertisements to the user will be described with reference to FIG. 12.

It is assumed that the user has a history of regularly using 5 times in a week and at least 1 hour each time an air-cleaning mode while using the air conditioner 320 disposed in a workplace. In this case, the first server 110 collects and analyzes the use history of the air conditioner 320 through the resource collection unit 1101 and thus the user may grasp that a mode mainly using when using the air conditioner 320 is an air clean mode.

A user service unit 1105 of the first server 110 may learn the use history of the user with artificial intelligence to determine that an intention in which the user uses the air conditioner 320 is to purify the air in addition to the control of an indoor temperature. Further, the user service unit 1105 may search for an 'air cleaner' among products registered in the fourth server 140. Further, the user service unit 1105 may search for advertisements and various use reviews related to the 'air cleaner' in the fifth server 150.

The first server 110 may output a searching result of the fourth server 140 and the fifth server 150 through the display unit included in the television 310, the PC 330, and the mobile device 340, and the user may receive product information on the 'air cleaner'.

In this way, when using a system for providing a service to a user using an IoT device according to the present disclosure, all apps that should be used for using functions provided by individual IoT devices may be driven in a cloud environment and thus the user can conveniently purchase and drive apps. Further, even if all manufacturers of individual IoT devices are different, the user can easily purchase and drive a wide variety of apps in a cloud environment and thus a price of providing the app can be reduced, and a production cost of the IoT device can be lowered. Further, according to the present disclosure, when using a system for providing a service to a user using an IoT device, a developer can easily develop an app or software in a unified platform and provide the app or software to the user, thereby reducing a time and cost consumed for developing and producing the app or software.

Hereinafter, a method in which a system according to the present disclosure provides a service to a user using an IoT device will be described with reference to FIGS. 13 to 16. When describing a method in which a system according to the present disclosure provides a service to a user using an IoT device, a description of the same configuration as that of the systems 30, 40, and 50 according to various embodiments of the present disclosure may be omitted to avoid the repeated description and be described using the same reference numeral.

Figure 13:
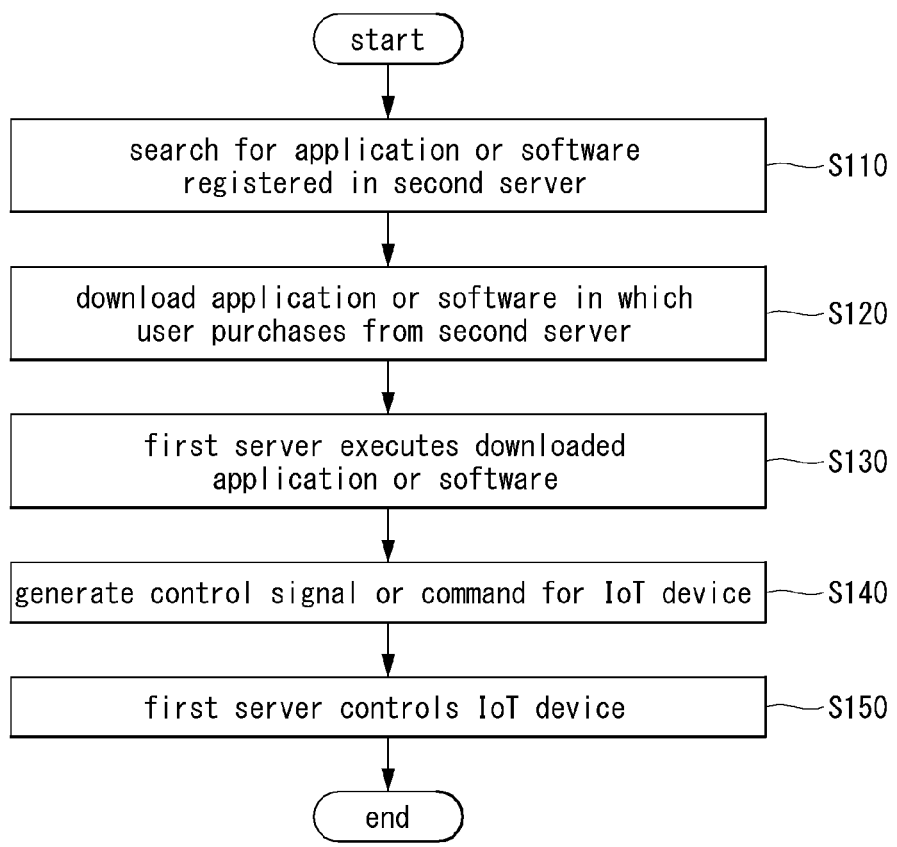
FIG. 13 is a flowchart illustrating a method in which a system provides a service to a user using an IoT device according to an embodiment of the present disclosure.

FIG. 13 is a flowchart illustrating a method in which a system provides a service to a user using an IoT device according to an embodiment of the present disclosure.

Referring to FIG. 13, the first server 110 according to an embodiment of the present disclosure may execute a function of an IoT device and determine whether an application or software that may implement a service to be provided to a user through a function of the IoT device is registered in the second server 120 (S110).

When the user purchases or subscribes to an application or software in the second server 120, the first server 110 downloads the application or software from the second server 120 (S120).

The first server 110 executes the downloaded application or software on the first server 110 (S130), and the executing application or software generates a control signal or a command for an individual IoT device (S140).

Thereafter, the first server 110 transmits the generated control signal or command to the plurality of IoT devices to control the plurality of IoT devices (S150).

Figure 14:
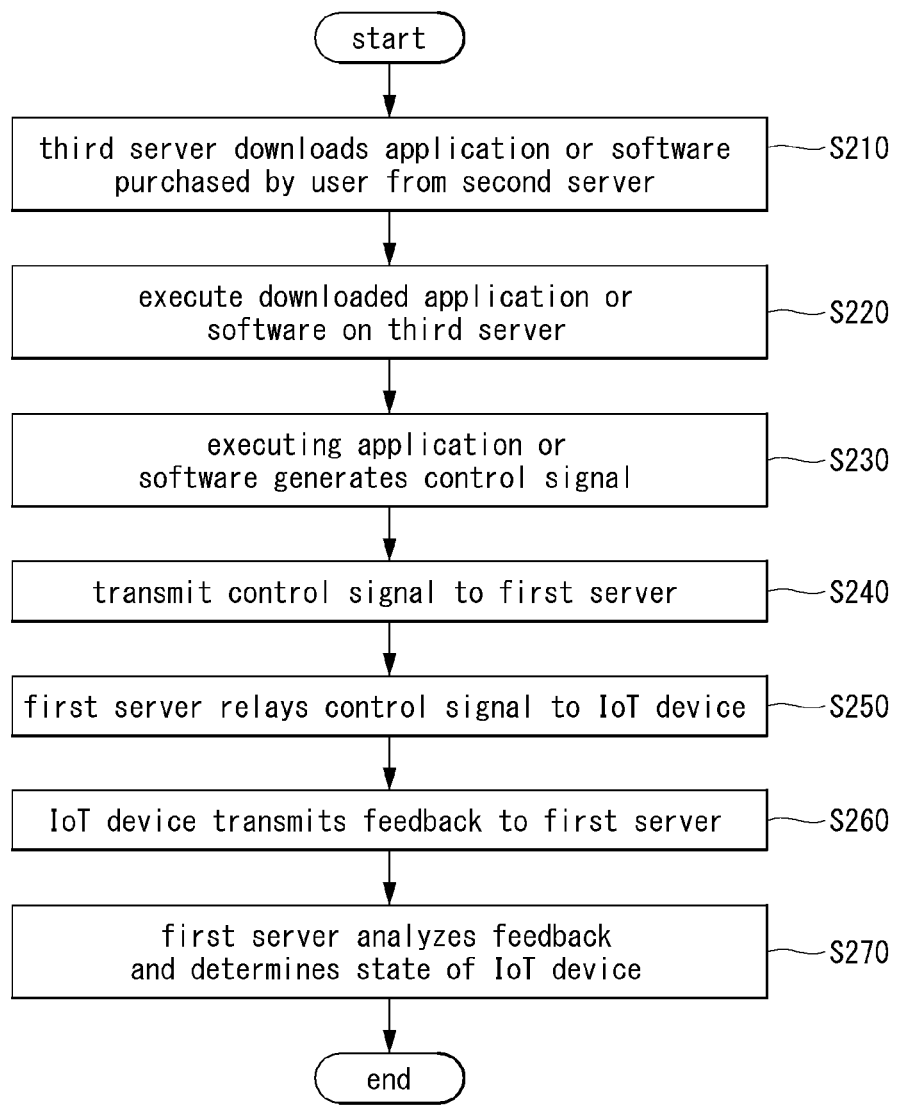
FIG. 14 is a flowchart illustrating a method in which a system provides a service to a user using an IoT device according to another embodiment of the present disclosure.

The system 40 according to another embodiment of the present disclosure is configured with a cloud environment, and a method of providing a service to a user using the system 40 is illustrated in FIG. 14. FIG. 14 is a flowchart illustrating a method in which a system provides a service to a user using an IoT device according to another embodiment of the present disclosure.

Referring to FIG. 14, a user may first purchase an application or software registered in the second server 120, and the third server 130 may download an application or software purchased by the user from the second server 120 (S210).

The application or software downloaded to the third server 130 is executed on the third server 130 (S220). The application or software executing in the third server 130 generates a control signal or a command for the IoT device (S230), and the third server 130 transmits the generated control signal or command to the first server (S240).

The first server 210 relays the transmitted control signal or command to the IoT device (S250), and the IoT device executes a function according to the relayed control signal or command. Thereafter, the IoT device configures a function execution result and current status data of the device as feedback data and transmits the function execution result and the current status data to the first server 210 (S260).

The first server 210 recognizes and analyzes feedback data transmitted from the IoT device as feedback of the IoT device and determines a current state of the IoT device (S270).

Figure 15:
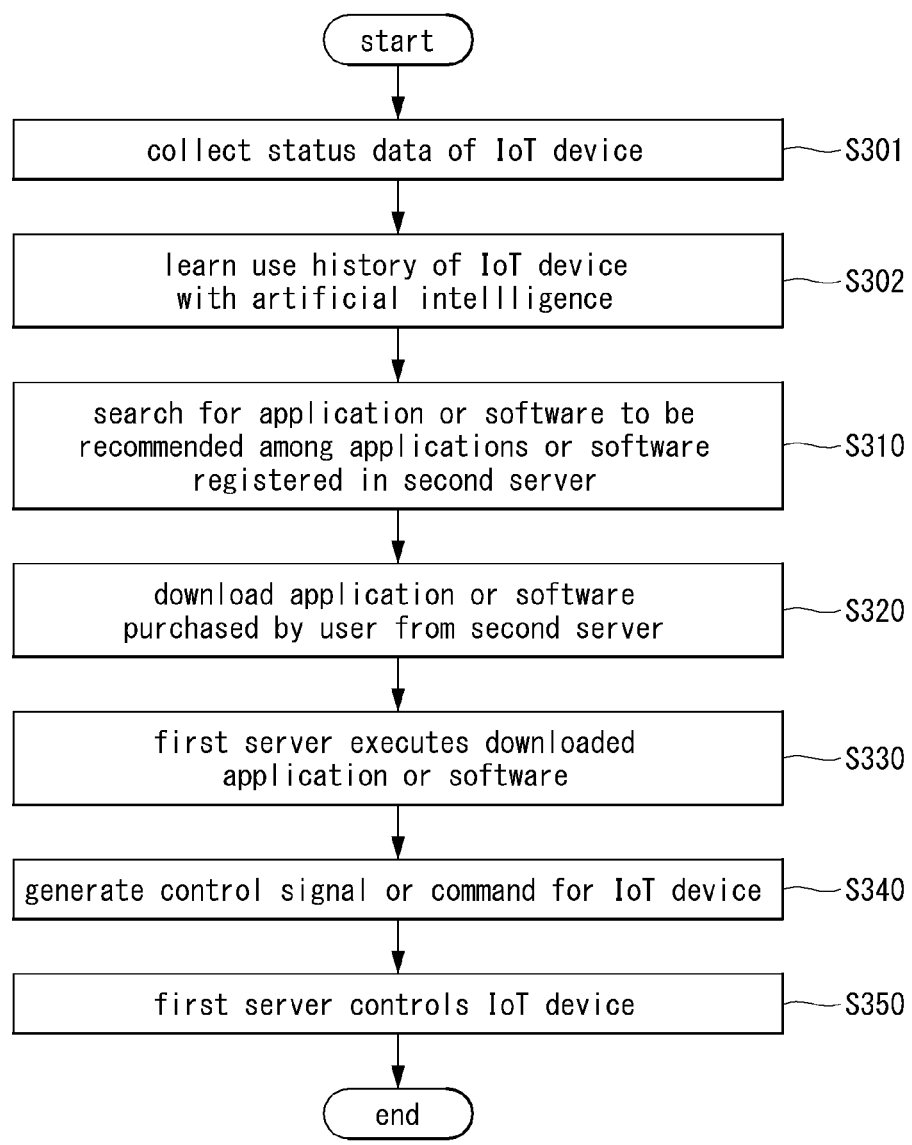
FIG. 15 is a flowchart illustrating a method in which a system 50 provides a service to a user using an IoT device according to another embodiment of the present disclosure.
Figure 16:
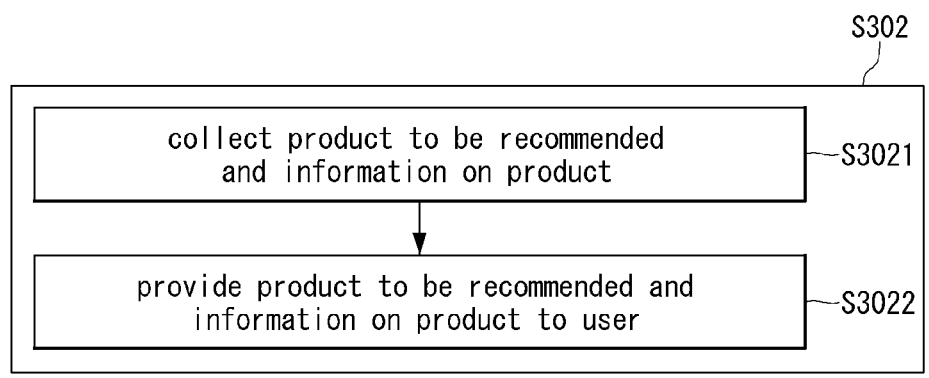
FIG. 16 is a diagram illustrating a method in which a system 50 recommends a product to a user according to another embodiment of the present disclosure.

The system 50 according to another embodiment of the present disclosure provides a service to a user according to the methods illustrated in FIGS. 15 to 16. FIG. 15 is a flowchart illustrating a method in which the system 50 provides a service to a user using an IoT device according to another embodiment of the present disclosure, and FIG. 16 is a diagram illustrating a method in which the system 50 recommends a product to the user according to another embodiment of the present disclosure.

Referring to FIGS. 15 and 16, in the system 50 according to another embodiment of the present disclosure, the first server 110 collects status data of each of the IoT devices using the resource collection unit 1101 (S301).

The first server 110 learns the user's history using the IoT device or the history of the service provided through a function of the IoT device with artificial intelligence (S302). Based on the learning result of such a history, the first server 110 collects a product to be recommended to a user and information on the product from the fourth server 140, as illustrated in FIG. 16 (S3021). As illustrated in FIG. 16, the first server 110 may output the collected information about the product to be recommended through the IoT device (S3022). In this case, the user may receive information on the recommended product through the IoT device and purchase the recommended product.

Further, as illustrated in FIG. 15, the first server 110 searches for an application or software to be recommended to the user among applications or software registered in the second server 120 based on the learning result of the above-described history (S310).

When the user purchases or subscribes to an application or software from the second server 120, the first server 110 downloads the application or software from the second server 120 (S320).

The first server 110 executes the downloaded application or software on the first server 110 (S330), and the executing application or software generates a control signal or command for an individual IoT device (S340).

Thereafter, the first server 110 transmits the generated control signal or command to a plurality of IoT devices to control the plurality of IoT devices (S350).

In this way, in a method of providing a service to a user through a system according to the present disclosure, because an application or software that operates a function of an IoT device is driven in a cloud environment, the IoT device may include only hardware necessary for networking as a configuration and thus a time and money consumed for production of IoT devices can be saved and a cost can be lowered.

Further, by providing a unified and open protocol instead of different protocols for each manufacturer or service provider, a system and method for providing a service to the user through the system according to the present disclosure can induce so that various developers participate in development of an application or software operating functions of the IoT device.

Moreover, a method of providing a service to a user through the system according to the present disclosure learns a user's device use pattern and provides an optimal application and software to the user according to the pattern and thus user convenience is increased in using the IoT device.

The present disclosure may be implemented as a computer readable code in a program recording medium. The computer readable medium includes all kinds of record devices that store data that may be read by a computer system. The computer readable medium may include, for example, a Hard Disk Drive (HDD), a Solid State Disk (SSD), a Silicon Disk Drive (SDD), a read-only memory (ROM), a random-access memory (RAM), a compact disc read-only memory (CD-ROM), a magnetic tape, a floppy disk, an optical data storage device and the like and also include a medium implemented in the form of a carrier wave (e.g., transmission through Internet). Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

According to a system and method for providing a service to a user using an IoT device according to the present disclosure, because an application or software that operates a function of the IoT device is driven in a cloud environment, the IoT device can include only hardware required for networking as a configuration, thereby saving a time and money consumed in the production of IoT devices and lowering costs.

According to a system and method for providing a service to a user using an IoT device according to the present disclosure, by providing a unified and open protocol instead of different protocols for each manufacturer or service provider, the system and method can induce so that various developers participate in development of an application or software operating functions of the IoT device.

According to a system and method for providing a service to a user using an IoT device according to the present disclosure, by providing an optimal application and software to the user according to a pattern by learning a user's device use pattern, user convenience is increased in using the IoT device.

DESCRIPTION OF SYMBOLS

| | |
|---|---|
| 110: first server | 1101: resource collection unit |
| 120: second server | 1102: user account unit |
| 130: third server | 1103: message processing unit |
| 140: fourth server | 1104: interface unit |
| 150: fifth server | |

What is claimed is:

1. A system for providing a service using an internet of things (IoT) device, the system comprising:
a plurality of IoT devices disposed in a predetermined area;
a first server connected to the plurality of IoT devices by a network and configured to execute an application for implementing the service,
a second server configured to register a product associated with the service and information about the product associated with the service; and a third server configured to store advertisement or content for the registered product in the second server, wherein the first server comprises one or more processors configured to:

before determining whether the application implementing the service is registered in the second server, collect status data generated by the plurality of IoT devices and determine a history usage of an individual IoT device or the service by the user with artificial intelligence;

store information about a user using the service;

share the status data to the plurality of IoT devices by processing the collected status data;

provide a recommended product among registered products and information corresponding to the recommended product to the user through the individual IoT device; and provide the stored advertisement or content for the recommended product based on learning results of the determined history through the individual IoT device, wherein the application is downloaded from the second server after determining the history of usage of the individual IoT device or the service by the user with artificial intelligence.

2. The system of claim 1, wherein the one or more processors are further configured to execute the application to generate a control signal or a command for the individual IoT device and to enable the first server to control the individual IoT device using the generated control signal or command.

3. The system of claim 1, further comprising a fourth server configured to provide the application and to distribute the application through the network.

4. The system of claim 1, wherein the first server is further configured to provide a development console capable of developing an application implementing the service.

5. The system of claim 1, wherein the plurality of IoT devices comprise at least one of a television, a speaker, a smart phone, an air conditioner, an air purifier, a refrigerator, a kimchi refrigerator, a water purifier, a dishwasher, a microwave, a washing machine, a dryer, a styler, a cleaning robot, a massage chair, a personal computer (PC), a tablet, or a projector.

6. The system of claim 1, wherein the one or more processors is further configured to recognize and process input by the user or a voice uttered by the user as a command of the user.

7. The system of claim 1, further comprising a fifth server comprising a same configuration as the first server, wherein the fifth server is configured to transmit a control signal or a command generated in an additional application executed on the fifth server to the first server, and wherein the first server is configured to transmit the collected status data to the fifth server and to transmit a control signal or a command generated in the fifth server to the plurality of IoT devices.

8. A method of providing a service using a system for providing the service to a user using an IoT device and a first server connected to a plurality of IoT devices, the method comprising:

before determining whether an application implementing the service is registered in a second server, collecting, by a first server, status data generated by the plurality of IoT devices and determining a history of the service provided through a function of an individual IoT device or a usage history of the individual IoT device with artificial intelligence;

providing a recommended product among registered products and information corresponding to the recommended product to the user through the individual IoT device;

providing advertisement or content for the recommended product based on learning results of the determined history through the individual IoT device;

determining, by the first server, whether the application implementing the service is registered in the second server;

downloading the application in the second server to the first server based at least in part on a determination, by the first server, that the application implementing the service is registered in the second server;

executing the downloaded application in the first server;

generating, by the executed application, a control signal or a command for the individual IoT device; and controlling, by the first server, the plurality of IoT devices using the generated control signal or the command for the individual IoT device.

9. The method of claim 8, wherein the application implementing the service is determined to be registered in the second server based at least in part on searching for a recommended application among applications registered in the second server to the user based on the determined history.

10. The method of claim 8, further comprising:

after determining the history of the service, collecting, by the first server, a recommended product to the user and information on the recommended product based on the determined history; and providing, by the first server, the collected recommended product and information on the recommended product to the user through the individual IoT device.

11. A method of providing a service using a system for providing the service to a user using an IoT device and a first server connected to a plurality of IoT devices, the method comprising:

before determining, by the first server, whether an application implementing the service is registered in a second server, collecting, by the first server, status data generated by the plurality of IoT devices and determining a history of usage of the service provided through a function of an individual IoT device or a usage history of the individual IoT device with artificial intelligence;

providing a recommended product among registered products and information corresponding to the recommended product to the user through the individual IoT device;

providing advertisement or content for the recommended product based on learning results of the determined history though the individual IoT device;

downloading the application from a second server to a third server;

executing, on the third server, the downloaded application;

generating, by the downloaded application, a control signal or a command for the individual IoT device;

transmitting the generated control signal or command to the first server;

relaying, by the first server, the generated control signal or the command to the individual IoT device;

transmitting, by the individual IoT device, feedback to the first server; and determining, by the first server, a current state of the individual IoT device by analyzing the transmitted feedback.

\* \* \* \* \*